(No Model.)
A. N. MILLER.
ADJUSTING DEVICE FOR ROLLS.
No. 318,574. Patented May 26, 1885.
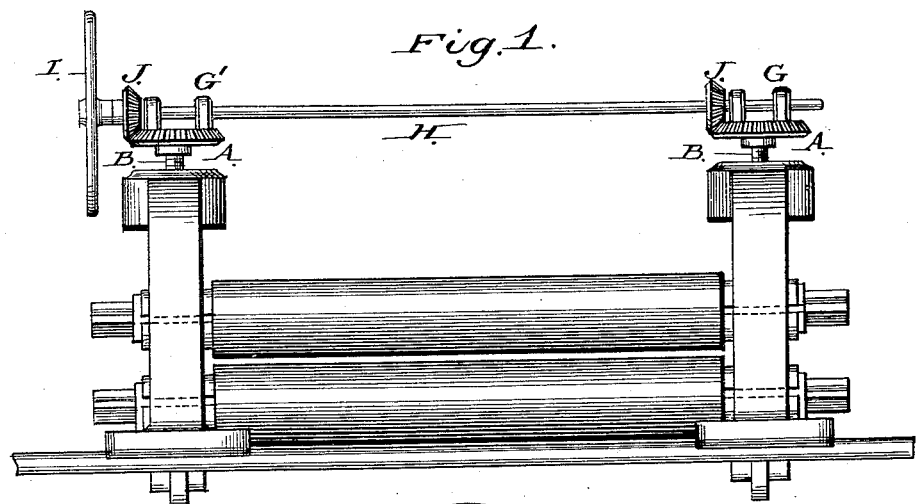
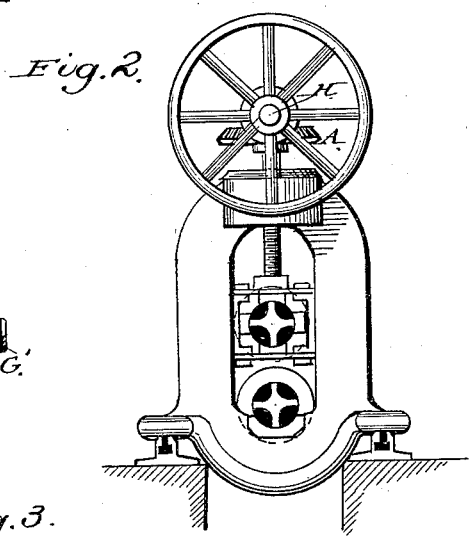
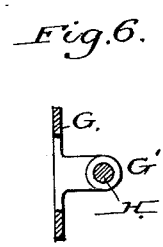
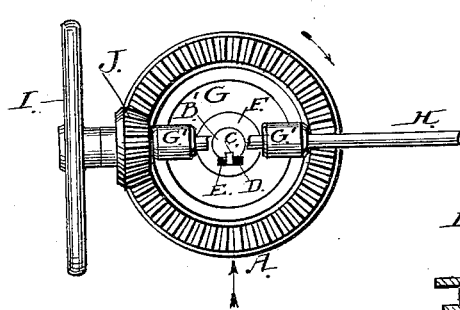
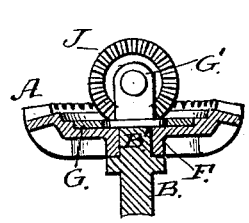
WITNESSES
INVENTOR
Absalom N. Miller,
pr Thomas P. Kinsey
Attorney

UNITED STATES PATENT OFFICE.

ABSALOM N. MILLER, OF POTTSTOWN, PENNSYLVANIA.

ADJUSTING DEVICE FOR ROLLS.

SPECIFICATION forming part of Letters Patent No. 318,574, dated May 26, 1885.

Application filed April 8, 1885. (No model.)

*To all whom it may concern:*

Be it known that I, ABSALOM N. MILLER, a citizen of the United States, residing at Pottstown, county of Montgomery, State of Pennsylvania, have invented a new and useful Improvement in Tightening-Down Gear for Roll-Screws, of which the following is a specification.

This improvement is related to the elevating and depressing hand-gear of screws for plate-rolls, &c.

The object of the improvement is to enable the screwsman to adjust the screws relative to each other so that they shall bottom upon the bearings at the same instant of time, and thus bring the top roll down parallel to the lower roll, the adjustment being made without dismantling the gear.

The above objects are attained in the use of the arrangement shown in the accompanying drawings, similar letters upon which indicate similar parts.

Figure 1 is a front elevation of a pair of housings and rolls for a plate-mill with my improvement attached; Fig. 2, an end elevation of the same; Fig. 3, a top plan of the screw-neck driving-gear and improved attaching-keys upon an enlarged scale; Fig. 4, a sectional detail of the improvement; Fig. 5, a detached plan of the gear-supporting plate, which in service rests within a recess in the screw-neck wheel; Fig. 6, a cross-section of the same on the line $d\,d$ of Fig. 5; Fig. 7, an elevation and end view of the main and sub keys.

By the adoption of my improvement a great saving of time and labor is effected in the adjustment of the screws. The usual custom is on running down the screws, if it is found that they do not bottom properly upon the bearing-boxes, to raise the pinions out of gear with the screw-bevels, and to turn one or both partly round, or in opposite directions for one or two cogs or more, according to the difference of space existing between the bearing-point of the screws and the bearing-boxes, and this cut-and-try system is prolonged until a proper bearing is secured.

In the use of my improvement a positive known quantity due to the pitch and proportional diameters of screw and gear for a rise and fall of the screw is obtained by the simple device of using two or more sub-keys fitted in the hub of the screw-neck wheel, but independent of the neck of the screw. The independent or sub keys may be in thickness any subdivision of the pitch of the gear. I find practically that one sub-key of one-fourth the pitch and one of one-half the pitch with the main key of the full pitch give all the changes needed to meet the wants of the screwsman.

I make no change practically in the usual screw-tightening-down gear, except that the neck-bevel A is bored to fit snug but movably upon the neck B' of the screw B. The main key C, usually of the width of the pitch of the gear or a proportionate fraction of the same, is solidly bedded in the neck of the screw, and projects about one-half its width into a keyway provided in the hub of the screw-bevel. A sub-key, E, of about one-half inch longer than the neck B', is laid against the main key C on one side, and another sub-key, D, about one-half inch longer than the key E, is laid against the main key upon its opposite side, the width of key-seat in the hub F being such as to receive the three keys C, D, and E, which are so fitted that either or both of the keys D and E may be withdrawn from the keyway, and their relative positions be changed therein, their normal position being as shown, C being central, with D upon the right and E upon the left hand side of the same, looking in the direction of the arrow on the plan in Fig. 3. This arrangement may be reversed, or both D and E may be placed together upon either side of the main key. Assuming as an example a screw-neck of five inches diameter, with a neck bevel-wheel of twenty inches diameter pitch-line, and cogs, say, of one inch pitch, this would give a main key, C, of one inch in width, a sub-key, D, of one-half inch width, and a sub-key, E, of one-fourth of an inch width. With this proportion of gear to neck, and the pitch of the screw also one inch, the removal of the quarter-inch key E filling up the space left in the hub by the reverse revolution of the gear, which will carry the neck-wheel around without moving the screw until the keyway in the wheel strikes the main key C, the key E is then dropped into the transposed keyway-space alongside of the key D, the shaft H is supported on the plate G in the bearings G', the plate G resting in a recess in the wheel A, the shaft being revolved to the right or left by the hand-wheel I, the pinions J J, keyed to said shaft, will carry the screws also to the right or left, as the screws are cut, and cause the same to ascend or descend in the housing-nut. If only one of the screw-keys were changed, as described, to the extent of one sixty-fourth of an inch difference in vertical height, and if both wheels were altered in the same manner, but reverse to each other, the difference in vertical height of the ends of the screws would be doubled, and a trans position of the keys D would again double up the difference. By screwing down, loosening the keys, reversing the gear, and again, with the keys in place, screwing down, any desired change in the relative projection of the screws below the nuts may be secured. Owing to wear of boxes and bearings, frequent adjustment of the screws is necessary, which, were it done in the usual manner, would cause much delay and annoyance in busy times; but having the gear provided with keys, as described, the changes required can be made in a few minutes, and while using the rolls, the additional length given to the sub-keys being for the purpose of permitting them to be handled while hot with a pair of pinchers or tongs. The sub-keys are concave next to the screw-neck B' and convex on the face next to the hub-keyway in F, the key-seat in the latter having its back concentric with its bore.

Having shown my improvement and described the advantages derived from its use and its mode of construction, I desire to secure by Letters Patent the following claims thereon:

1. As an improvement in tightening-down gear for roll-screws, the enlarged width given the keyway in the screw driving wheel, and filling out the space left between its sides and the main fixed key of the screw-neck with one or more loosely-fitted sub-keys proportionally divided relative to the pitch, respectively, of both gearing and screw, substantially as described, and for the purpose set forth.

2. In combination with the usual tightening-down gear for screws of plate or bar rolls, a fixed key, C, in the neck of the screw, flanked on one or both sides with loosely-fitted sub-keys D E, the keyway in the hub of the neck-wheel being of a width adapted to receive both main and sub keys, the latter being made to vary in length and thickness, as described, and for the purpose specified.

ABSALOM N. MILLER.

Witnesses:
JOHN A. WEBER,
GEORGE F. P. WANGER.